United States Patent [19]
Muto et al.

[11] Patent Number: 5,508,326
[45] Date of Patent: Apr. 16, 1996

[54] EMULSIFYING EPOXY RESIN COMPOSITION AND CURABLE COMPOSITION

[75] Inventors: Kiyoshi Muto; Hiroshi Suzuki, both of Tokyo, Japan

[73] Assignees: Asahi Denka Kogyo K.K.; A.C.R. Co., Ltd., both of Tokyo, Japan

[21] Appl. No.: 337,546

[22] Filed: Nov. 10, 1994

Related U.S. Application Data

[62] Division of Ser. No. 61,623, May 13, 1993, Pat. No. 5,391,596.

[30] Foreign Application Priority Data

Feb. 2, 1993 [JP] Japan ......................................... 5-15446

[51] Int. Cl.$^6$ ............................... C08K 3/20; C08L 63/02
[52] U.S. Cl. .................................................................. 523/415
[58] Field of Search ................................................. 523/415

[56] References Cited

U.S. PATENT DOCUMENTS 4,987,163  1/1991  Becker et al. ............................ 523/414

FOREIGN PATENT DOCUMENTS 2127829  4/1984  United Kingdom.

*Primary Examiner*—Melvyn I. Marquis
*Assistant Examiner*—D. Aylward
*Attorney, Agent, or Firm*—Flynn, Thiel, Boutell & Tanis

[57] ABSTRACT

An emulsifying epoxy resin composition having excellent emulsifiability and storage stability, which comprises a specific epoxy resin (I), an emulsifiable epoxy compound (II) prepared by reacting an urethane compound (II-1), prepared by the reaction of a polyalkylene polyether polyol compound (II-1-1) having a number average molecular weight of 200 to 12,000 and an ethylene oxide content of 80% by weight or above with an excess amount of a polyisocyanate compound (II-1-2), with a specific epoxy compound (II-2) and an alkylphenol ethoxylate (II-3) having a number average molecular weight of 300 to 5,000 at a specific ratio, and water (III). A curable composition having a high cure rate and the cured product obtained there from having excellent film strength, water resistance and so on, which comprises the above-described emulsifiable epoxy resin composition and an active organic amino compound (IV) is also within the scope of the present invention.

9 Claims, No Drawings

EMULSIFYING EPOXY RESIN COMPOSITION AND CURABLE COMPOSITION

This is a division of Ser. No. 08/061,623, filed May 13, 1993 now U.S. Pat. No. 5,391,596.

BACKGROUND OF THE INVENTION

1. Field of the Invention

The present invention relates to an emulsifying or emulsified epoxy resin composition, a curable composition and processes for preparation thereof.

2. Description of the Related Art

Solvents have been employed to solve or dilute epoxy resins in the prior art. It is, however, well known that the regulation on the use of solvents has recently become stricter owing to the danger of fire from the solvents, the environmental problems resulting from air pollution from the solvents, the influences of solvents on the human body, the increase in the cost of solvents and so on.

A coating process using an aqueous epoxy resin has been used to solve the above problems. However, since epoxy resin emulsions, that is, aqueous epoxy resins, of the prior art contain an unreactive emulsifier in order to secure its emulsion stability, coating films formed from the epoxy resin emulsions are inferior to those formed with epoxy resins as such, or solutions thereof in solvents, with respect to their properties such as resistances to water and chemicals and film strength. On the other hand, when an emulsifier is selected so as to be able to maintain the properties the coating film, it is difficult to emulsify an epoxy resin during the preparation of an epoxy resin emulsion.

U.S. Pat. No. 4,608,406 (published on Aug. 26, 1986; CELANESE CORP. and INTEREZ INC.) discloses a self-emulsification type epoxy resin prepared by modifying an epoxy resin. However, this epoxy resin has problems that the resin is poorly emulsifiable, the film formed by curing the resin exhibits poor film strength and the resin cures slowly.

Further, U.S. Pat. No. 4,446,256 (published on May 1, 1984; CELANESE CORP. and INTEREZ INC.) discloses a process for preparing a dispersant or an emulsifier for preparing aqueous epoxy resins which comprises reacting an aromatic, aromatic-originating or alicyclic diol with a diisocyanate and a long-chain aliphatic polyether glycol monoether, and U.S. Pat. No. 4,987,163 (published on Jan. 22, 1991; HOECHST AG) describes an aqueous disperse system, such as an emulsion or a suspension, comprising an epoxy resin prepared by dispersing or emulsifying a specific self-emulsification epoxy resin in water or a mixture of water with, if necessary, an organic solvent and/or additive. However, the preparations of these disperse or emulsion systems were not always easy in their dispersing or emulsifying step.

DISCLOSURE OF THE INVENTION

SUMMARY OF THE INVENTION

The present invention has been made under these circumstances. Namely, the present invention provides an emulsifying epoxy resin composition which is excellent in emulsifiability in preparation and storage stability and is cured with an active organic amine curing agent to give a product having properties equivalent to those of a product produced by curing an ordinary solvent-free or solvent type epoxy resin.

The present invention relates to an emulsifying or emulsified epoxy resin composition comprising or essentially consisting of:

(I) an epoxy resin having, on the average, more than one adjacent epoxy group in its molecule, i.e. epoxy groups in which an oxygen atom is bonded to adjacent carbon atoms, (II) an emulsifiable epoxy compound which is prepared by reacting an urethane compound (II-1), prepared by the reaction of a polyalkylene polyether polyol compound (II-1-1) having a number average molecular weight of 200 to 12,000 and an ethylene oxide content of 80% by weight or above with an excess amount of a polyisocyanate compound (II-1-2), with an epoxy compound (II-2) having, on the average, at least 0.1 hydroxyl group and at least one epoxy group with an oxygen atom bonded to adjacent carbon atoms and an alkylphenol ethoxylate (II-3) having a number average molecular weight of 300 to 5,000 at a molar ratio of (II-1):(II-2):(II-3) of 1.0:1.0–10.0:0.1–2.0, with the proviso that the equivalent ratio of the total hydroxyl content in (II-2) and (II-3) to the isocyanate content in (II-1) must be 1.0 or above, and (III) water.

The present invention also relates to an emulsifying or emulsified epoxy resin composition comprising or essentially consisting of:

(I) an epoxy resin having, on the average, more than one adjacent epoxy group in its molecule, i.e. epoxy groups in which an oxygen atom is bonded to adjacent carbon atoms, (II) an emulsifiable epoxy compound which is prepared by reacting an urethane compound (II-1), prepared by the reaction of a polyalkylene polyether polyol compound (II-1-1) having a number average molecular weight of 200 to 12,000 and an ethylene oxide content of 80% by weight or above with an excess amount of a polyisocyanate compound (II-1-2), with an epoxy compound (II-2) having, on the average, at least 0.1 hydroxyl group and at least one epoxy group with an oxygen atom bonded to adjacent carbon atoms and an alkylphenol ethoxylate (II-3) having a number average molecular weight of 300 to 5,000 at a molar ratio of (II-1):(II-2):(II-3) of 1.0:1.0–10.0:0.1–2.0, with the proviso that the equivalent ratio of the total hydroxyl content in (II-2) and (II-3) to the isocyanate content in (II-1) must be 1.0 or above, (V) a solvent
and
(III) water.

In other words, the present invention relates to an emulsifying epoxy resin composition characterized by comprising or essentially consisting of:

(I) an epoxy resin having, on the average, more than one adjacent epoxy group in its molecule, i.e. epoxy groups in which an oxygen atom is bonded to adjacent carbon atoms, (II) an emulsifiable epoxy compound (which may be dispersed in a solvent in a solid content ranging from 10 to 90% by weight) which is prepared by reacting an urethane compound (II-1), prepared by the reaction a polyalkylene polyether polyol compound (II-1-1) having an average molecular weight of 200 to 12,000 and an ethylene oxide content of 80% by weight or above with an excess of a polyisocyanate compound (II-1-2), with an epoxy compound (II-2) having at least more than 0.1 hydroxyl group and an epoxy group with and oxygen atom bonded to adjacent carbon atoms and an alkylphenol ethoxylate (II-3) having an average molecular weight of 300 to 5,000 at a molar ratio of (II-1):(II-2):(II-3) of 1.0:1.0 –10.0:0.1–2.0 (with the proviso that the equivalent ratio of the total hydroxyl content in (II-2) and (II-3) to the isocyanate content in (II-1) must be 1.0 or above), and (III) water.

Further, the present invention relates to a curable composition comprising or essentially consisting of the above-described emulsifying epoxy resin composition and an active organic amino compound (IV).

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In the present invention, "adjacent epoxy group" is represented by the formula:

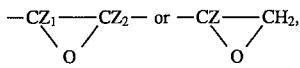

wherein $Z_1$, $Z_2$ and Z is a hydrogen atom or a methyl or ethyl group.

The epoxy resin (I) having, on the average, more than one, preferably 1.3 or more epoxy groups having an oxygen atom bonded to adjacent carbon atoms in its molecule according to the present invention includes:

epoxy resins (I-1) having, on the average, more than one substituted or unsubstituted glycidyl ether group represented by the formula:

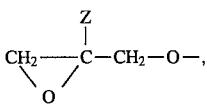

wherein Z is a hydrogen atom or a methyl or ethyl group, in the molecule;

epoxy resins (I-2) having, on the average, more than one substituted or unsubstituted glycidyl ester group represented by the formula:

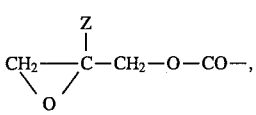

wherein Z is a hydrogen atom or a methyl or ethyl group, in the molecule; and epoxy resins (I-3) having, on the average, more than one N-substituted substituted or unsubstituted 1,2-epoxypropyl group represented by the formula:

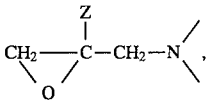

wherein Z is a hydrogen atom or a methyl or ethyl group, in the molecule.

The above epoxy resin (I-1) having, on the average, more than one substituted or unsubstituted glycidyl ether group in its molecule is, for example, an epoxy resin prepared by converting a phenolic hydroxyl group into a glycidyl ether group or one prepared by converting an alcoholic hydroxyl group into a glycidyl ether group. Preferable examples of the epoxy resin (I-1) include polyglycidyl ethers (I-1-1) of polyhydric phenols having one or more aromatic nuclei; polyglycidyl ethers (I-1-2) of alcoholic polyhydroxyl compounds prepared by the addition reaction of polyhydric phenols having one or more aromatic nuclei with alkylene oxides having 2 to 4 carbon atoms; and polyglycidyl ethers (I-1-3) of nucleus-free aliphatic polyhydroxyl compounds.

Polyglycidyl ether (I-1-1) is, for example, an epoxy resin comprising, as the main reaction product, a polyglycidyl ether which is prepared by reacting a polyhydric phenol (a) having at least one aromatic nucleus with an epihalohydrin (b) in the presence of a basic catalyst such as sodium hydroxide or a stoichiometric amount of a basic compound according to a conventional process; or one prepared by reacting a polyhalohydrin ether, prepared by the reaction of a polyhydric phenol (a) having at least one aromatic nucleus with an epihalohydrin (b) in the presence of a catalytic amount of a basic catalyst such as triethylamine according to a conventional process, with a basic compound such as sodium hydroxide.

On the other hand, polyglycidyl ethers (I-1-2) or (I-1-3) is an epoxy resin comprising, as the main reaction product, a polyglycidyl ether which is prepared by, for example, reacting a polyhalohydrin ether, prepared by the reaction of a polyhydroxyl compound (c) prepared by the addition reaction of a polyhydric phenol (a) having at least one aromatic nucleus with an alkylene oxide having 2 to 4 carbon atoms (the case where polyglycidyl ether (I-1-2) is prepared) or a nucleus-free aliphatic polyhydroxyl compound (d) (the case where polyglycidyl ether (I-1-3) is prepared) with an epihalohydrin (b) in the presence of a catalytic amount of an acidic catalyst such as boron trifluoride according to a conventional process, with a basic compound such as sodium hydroxide.

The above polyhydric phenol (a) having at least one aromatic nucleus includes mononuclear polyhydric phenols (a-1) having one aromatic nucleus and polynuclear polyhydric phenols (a-2) having two or more aromatic nuclei.

Examples of the mononuclear polyhydric phenol (a-1) include resorcinol, hydroquinone, pyrocatechol, phloroglucinol, 1,5-dihydroxynaphthalene, 2,7-dihydroxynaphthalene and 2,6-dihydroxynaphthalene.

On the other hand, examples of the polynuclear polyhydric phenol (a-2) include polynuclear dihydric phenols represented by the general formula (a-2-1):

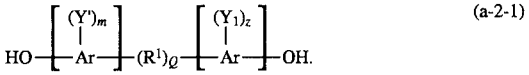 (a-2-1)

In the above formula (a-2-1), Ar is a divalent aromatic hydrocarbon group such as a naphthylene or phenylene group, the phenylene group being preferable for the object of the present invention. Two Ar groups are the same or different from each other. Y' and $Y_1$ may be the same or different from each other, and Y' and $Y_1$ are each an alkyl group, preferably one having at most 4 carbon atoms, such as a methyl, n-propyl, n-butyl, n-hexyl or n-octyl group, a halogen atom such as a chlorine, bromine, iodine or fluorine atom, or an alkoxy group, preferably one having at most 4 carbon atoms, such as a methoxy, methoxymethyl, ethoxy, ethoxyethyl, n-butoxy or amyloxy group. m and z are each an integer of 0 to the maximum value corresponding to the number of hydrogen atoms on the aromatic ring (Ar) replaceable with substituents and may be the same or different from each other. When either or both of the above divalent aromatic hydrocarbon groups have substituents other a hydroxyl group, these substituents may be the same or different. In other words, when m (or z) is 2 or more, plural Y' groups (or plural $Y_1$ groups) are the same or different from each other.

In the above formula (a-2-1), $R_1$ is a divalent group, for example, —CO—, —O—, —S—, —SO—, —$SO_2$— or —$(S)_n$— (wherein n is an integer of 2 to 6); an alkylene group such as a methylene, ethylene, trimethylene, tetramethylene, pentamethylene, hexamethylene, 2-ethylhexamethylene, octamethylene, nonamethylene or decamethylene group; an alkylidene group such as an ethylidene, propylidene, isopropylidene, isobutylidene, amylidene, isoamylidene, 1-phenylethylidene or ω-(halogenodicyclopentadienyl)alkylidene group; a cycloaliphatic group such as a 1,4-cyclohexylene, 1,3-cyclohexylene or cyclohexylidene group; a halogenoalkylene, halogenoalkylidene or halogenated cycloaliphatic group; an alkoxy- or aryloxy-substituted alkylidene, alkylene or cycloaliphatic group such as a methoxymethylene, ethoxymethylene, ethoxyethylene, 2-ethoxytrimethylene, 3-ethoxypentamethylene, 1,4-(2-methoxycyclohexane), phenoxyethylene, 2-phenoxytrimethylene or 1,3-(2-phenoxycyclohexane) group; an arylalkylene group such as a phenylethylene, 2-phenyltrimethylene, 1,7-diphenylpentamethylene or 2-phenyldecamethylene group; an aromatic group such as a phenylene or naphthylene group; a halogenated aromatic group such as a 1,4-(2-chlorophenylene) or 1,4-(2-fluorophenylene) group; an alkoxy- or aryloxy-substituted aromatic group such as a 1,4-(2-methoxyphenylene), 1,4-(2-ethoxyphenylene), 1,4-(2-n-propoxyphenylene) or 1,4-(2-phenoxyphenylene) group; an alkyl-substituted aromatic group such as a 1,4-(2-methylphenylene), 1,4-(2-ethylphenylene), 1,4-(2-n-propylphenylene), 1,4-(2-n-butylphenylene) or 1,4-(2-n-dodecylphenylene) group; a group represented by the formula:

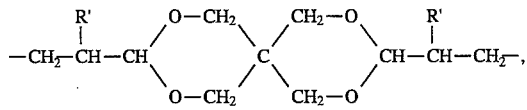

wherein R' is each a hydrogen or halogen atom or an alkyl group having 1 to 6 carbon atoms; or a divalent hydrocarbon group represented by the formula:

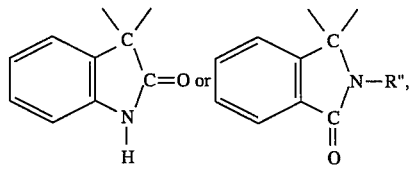

wherein R" is a hydrogen atom or a hydrocarbon group which may be substituted with a hydroxyl or epoxy group. Alternatively $R_1$ may be a ring fused to one of the above Ar groups, as in a case where a compound represented by the general formula (a-2-1) is represented by the formula:

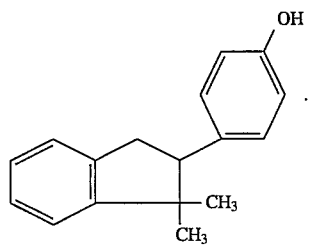

Further, $R_1$ may be a polyalkoxy group such as a polyethoxy, polypropoxy, polythio-ethoxy, polybutoxy or polyphenylethoxy group; a silicon-containing group such as a polydimethylsiloxy, polydiphenylsiloxy or polymethylphenylsiloxy group; or a group comprising two or more alkylene and/or alkylidene groups which are separated by an aromatic ring, tertiary amino group, ether linkage, carbonyl group, sulfur or sulfur-containing linkage such as sulfoxide. Q in the above formula (a-2-1) is 0 or 1.

Among these polynuclear dihydric phenols, particularly preferable compounds are those represented by the general formula (a-2-1-1):

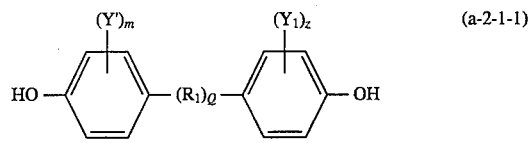

wherein Y' and $Y_1$ are each as defined above; m and z are each an integer of 0 to 4; $R_1$ is an alkylene or alkylidene group, preferably one having 1 to 3 carbon atoms, or a saturated group represented by the formula:

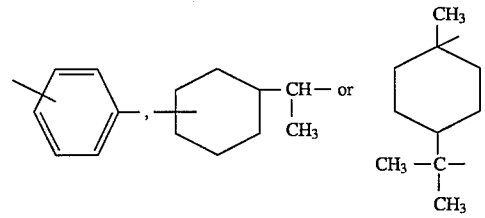

and Q is 0 or 1.

Examples of such dihydric phenols include bis(hydroxyphenyl)alkanes such as 2,2-bis(4-hydroxyphenyl)propane generally called "bisphenol A (trade name)", 2,4'-dihydroxydiphenylmethane, bis(2-hydroxyphenyl)methane, bis(4-hydroxyphenyl)methane, bis(4-phenyl-)methane, bis(4-hydroxyphenyl)methane, bis(4-hydroxy-2,6-dimethyl-3-methoxyphenyl)methane, 1,1-bis(4-hydroxyphenyl)ethane, 1,2-bis(4-hydroxyphenyl)ethane, 1,1-bis(4-hydroxy-2-chlorophenyl)ethane, 1,1-bis(3,5-dimethyl-4-hydroxyphenyl)ethane, 1,3-bis(3-methyl-4-hydroxyphenyl)propane, 2,2'-bis(3,5-dichloro-4-hydroxyphenyl)propane, 2,2-bis(3-phenyl-4-hydroxyphenyl)propane, 2,2-bis(3-isopropyl-4-hydroxyphenyl)propane, 2,2-bis(2-isopropyl-4-hydroxyphenyl)propane, 2,2-bis(4-hydroxynaphthyl)propane, 2,2-bis(4-hydroxyphenyl)pentane, 3,3-bis(4-hydroxyphenyl)pentane, 2,2-bis(4-hydroxyphenyl)heptane, bis(4-hydroxyphenyl)methane, bis(4-hydroxyphenyl)cyclohexylmethane, 1,2-bis(4-hydroxyphenyl)-1,2-bis(phenyl)propane and 2,2-bis(4-hydroxyphenyl)-1-phenylpropane;

dihydroxybiphenyls such as 4,4'-dihydroxybiphenyl, 4,4'-dihydroxyoctachlorobiphenyl, 2,2'-dihydroxybiphenyl and 2,4'-dihydroxybiphenyl; di(hydroxyphenyl) sulfones such as bis(4-hydroxyphenyl) sulfone, 2,4'-dihydroxydiphenyl sulfone, chloro-2,4-dihydroxydiphenyl sulfone, 5-chloro-4,4'-dihydroxydiphenyl sulfone and 3'-chloro-4,4'-dihydroxydiphenyl sulfone; and di(hydroxyphenyl) ethers such as bis(4-hydroxyphenyl) ether, 4,3'-(or 4,2'- or 2,2'-dihydroxydiphenyl) ether, 4,4'-dihydroxy-2,6-dimethyldiphenyl ether, bis(4-hydroxy-3-isobutylphenyl) ether, bis(4-hydroxy-3-isopropylphenyl) ether, bis(4-hydroxy-3-chlorophenyl) ether, bis(4-hydroxy-3-fluorophenyl) ether, bis(4-hydroxy-3-bromophenyl) ether, bis(4-hydroxynaphthyl) ether, bis(4-hydroxy-3-chloronaphthyl) ether, bis(2-hydroxybiphenyl) ether, 4,4'-dihydroxy-2,6-dimethoxydiphenyl ether and 4,4'-dihydroxy-2,5-diethoxydiphenyl ether. Further, 1,1-bis(4-hydroxyphenyl)-2-phenylethane, 1,3,3-trimethyl-1-(4-hydroxyphenyl)-6-hydroxyindan and 2,4-bis(p-hydroxyphenyl)-4-methylpentane are also suitable.

Another group of preferable examples of the polynuclear dihydric phenols are represented by the general formula (a-2-1-2):

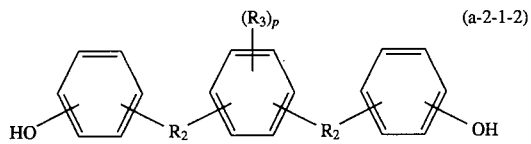

wherein $R_3$ is a methyl or ethyl group; $R_2$ is an alkylidene or alkylene group having 1 to 9 carbon atoms; and p is an integer of 0 to 4 with the proviso that plural $R_2$ groups are the same or different from each other and that plural $R_3$ groups are the same or different from each other when p is an integer of 2 to 4.

Examples of the polynuclear dihydric phenols represented by the above general formula (a-2-1-2) include 1,4-bis(4-hydroxybenzyl)benzene, 1,4-bis(-4-hydroxy-benzyl)tetramethylbenzene, 1,4-bis-(4-hydroxybenzyl)tetraethylbenzene, 1,4-bis(p-hydroxycumyl)benzene and 1,3-bis(p-hydroxycumyl)benzene.

Other examples of the polynuclear polyhydric phenol (a-2) include 1,1,2,2-tetrakis(4-hydroxyphenyl)ethane, precondensates of phenols with carbonyl compounds such as precondensates of phenol resins (phenolic novolak), condensate of phenol with acrolein, condensate of phenol with glyoxal, condensate of phenol with pentanediallyl, condensate of resorcinol with acetone and xylene-phenol-formaldehyde precondensate; and condensates of phenols with polychloromethylated aromatic compounds such as a condensate of phenol with bischloromethyxylene.

Polyhydroxyl compound (c) is a compound which is prepared by reacting the above polyhydric phenol (a), having at least one aromatic nucleus, with an alkylene oxide and in the presence of a catalyst for accelerating the reaction of a hydroxyl group with an epoxy group and which has atomic groups represented by the formula: —ROH (wherein R is an alkylene group resulting from the alkylene oxide and/or —(RO)$_n$H (wherein R is an alkylene group resulting from the alkylene oxide and each polyoxyalkylene chain may contain different alkylene units; and n is an integer of 2 or above corresponding to the number of polymerized oxyalkylene molecules) in a state bonded to the phenol residue through ether linkages. In this case, the equivalent ratio, that is, the hydroxyl group of the polyhydric phenol (a): the alkylene oxide, is 1:1 or more, preferably 1:1–10, still preferably 1:1–3.

Although the alkylene oxide includes ethylene oxide, propylene oxide and butylene oxides, one which is reacted with the polyhydric phenol (a) to form an ether having a side chain is particularly preferable and examples of such an alkylene oxide include propylene oxide, 1,2-butylene oxide and 2,3-butylene oxide, among which propylene oxide is particularly desirable.

A group of particularly preferable examples of the polyhydroxyl compound (c) are those represented by the general formula (c-1):

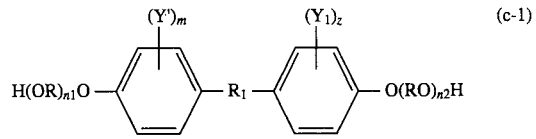

wherein Y', $Y_1$, m, z and $R_1$ are each as defined above with respect to the formula (a-2-1-1); R is an alkylene group having 2 to 4 carbon atoms; and n1 and n2 are each 1 to 3 and the same or different from each other.

Another group of preferable examples of the polyhydroxyl compound (c) are those represented by the general formula (c-2):

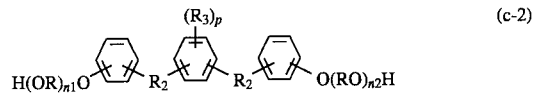

wherein $R_2$, $R_3$ and p are each as defined above with respect to the formula (a-2-1-2); R is an alkylene group having 2 to 4 carbon atoms; and n1 and n2 are each 1 to 3 and the same or different from each other. Additionally, the nucleus-containing polyhydroxyl compound (c) includes alicyclic polyols prepared from the polyhydric phenols (a) through the hydrogenation of the aromatic ring.

The nucleus-free aliphatic polyhydroxyl compound (d) includes polyhydric alcohols such as ethylene glycol, propylene glycol, butylene glycol, diethylene glycol, dipropylene glycol, dibutylene glycol, glycerol and pentaerythritol; polyvalent polyhydroxyl compounds prepared by the addition reaction of these polyhydric alcohols or other active hydrogen compounds, such as compounds having amino, carboxyl and/or thio hydroxyl groups, with alkylene oxides; and polyether polyols.

The above epihalohydrin (b) is a compound represented by the general formula (1):

wherein Z is a hydrogen atom or a methyl or ethyl group and X' is a halogen atom.

Examples of epihalohydrin (b) include epichlorohydrin, epibromohydrin, 1,2-epoxy-2-methyl-3-chloropropane and 1,2-epoxy-2-ethyl-3-chloropropane.

The acidic catalyst usable for accelerating the reaction of the above epihalohydrin (b) with the polyhydroxyl compounds (c) or (d) includes Lewis acids such as boron trifluoride, stannic chloride, zinc chloride and ferric chloride; active derivatives thereof such as boron trifluoride-ether complex and mixtures of two or more of them.

The basic catalyst usable for accelerating the reaction of the epihalohydrin (b) with the polyhydric phenol (a) includes alkali metal hydroxides such as sodium hydroxide, alkali metal alcoholates such as sodium ethylate, tertiary amines such as triethylamine and triethanolamine, quaternary ammonium compounds such as tetramethylammonium bromide and mixtures of two or more of them. The basic compound favorably usable either for the formation of a glycidyl ether simultaneous with the above reaction or for that conducted by subjecting the halohydrin ether formed by the above reaction to ring closure through dehydrohalogenation includes alkali metal hydroxides such as sodium hydroxide and alkali metal aluminates such as sodium aluminate.

These catalysts and basic compounds may, of course, be used either as such or as a solution in a suitable inorganic or organic solvent.

The epoxy resin (I-2) having, on the average, more than one substituted or unsubstituted glycidyl ester group in its molecule includes polyglycidyl esters of aliphatic and aromatic polycarboxylic acids (such as phthalic acid, isophthalic acid, terephthalic acid, tetrahydrophthalic acid, methyltetrahydrophthalic acid, hexahydrophthalic acid, methylhexahydrophthalic acid, endomethylenetetrahydrophthalic acid, methylendomethylenetetrahydrophthalic acid, maleic acid, fumaric acid, itaconic acid, succinic acid, glutaric acid, adipic acid, pimelic acid, suberic acid, azelaic acid, sebacic acid, aliphatic dimer acid, trimellitic acid, trimesic acid, pyromellitic acid and cyclopentanetetracarboxylic acids; halogen-substituted derivatives thereof; and carboxyl-terminated polyester oligomers prepared from these polycarboxylic acids and polyhydric alcohols), and epoxy resins prepared by polymerizing glycidyl methacrylates prepared from the epihalohydrins (b) represented by the general formula (1) and methacrylic acid.

The epoxy resin (I-3) having, on the average, more than one N-substituted substituted or unsubstituted 1,2-epoxypropyl group in its molecule includes those prepared from aromatic amines such as aniline and aniline having an alkali substituent, e.g., methyl group, on the nuclei and the epihalohydrins (b) represented by the above general formula (1); and those prepared from precondensates of aromatic amines with aldehydes such as aniline-formaldehyde precondensate and aniline-phenol-formaldehyde precondensate and the epihalohydrins (b).

The epoxy resin to be used in the present invention as the component (I) also includes those (I-4) obtained by treating the epoxy resins (I-1), (I-2) or (I-3) to adjust its epoxy equivalent (WPE: weight per epoxy equivalent) to a desired value.

The epoxy resin to be used in the present invention as the component (I) also includes those (I-5) generally called "specific epoxy resin", and examples thereof include polyglycidyl ether of polysiloxane, epoxy resins comprising oxazolidinone rings and epoxy groups bonded thereto through carbon atoms, diglycidyl ether of furan, diglycidyl ether of dioxane, diglycidyl ether of spirobi(m-dioxane), polyepoxy compound prepared from imidazoline substituted with a polyunsaturated alkenyl group at the position 2, and heterocyclic epoxy resins such as triglycidyl isocyanurate. Further, it includes various known epoxy resins as described in "Epoxy Jushi no Seizo to Oyo (Preparation and Application of Epoxy Resins)" (compiled by H. Kakiuchi).

Emulsifying or emulsified epoxy resins (I-6) can also be favorably used in the present invention as the component (I). Such an emulsifying or emulsified epoxy resin (I-6) can be easily prepared by adding a polyoxyethylene alkylphenol ether nonionic surfactant and/or a polyoxyethylene/polyoxypropylene block polyether to the above epoxy resin, preferably a bisphenol A type or bisphenol F type epoxy resin, and emulsifying the obtained mixture on a homomixer or homogenizer by a conventional process.

Preferably, examples of the polyalkylene polyether polyol compound (II-1-1) which is used in the preparation of the urethane compound (II-1) necessary for the formation the emulsifiable epoxy compound (II) and which exhibits water solubility include polyether polyols represented by the general formula (2):

$$R_4[(OR_5)_nOH]_p \quad (2)$$

wherein $R_4$ is a polyhydric alcohol residue; $(OR_5)_n$ is a polyoxyalkylene chain comprising oxyalkylene units wherein the alkylene group has 2 to 4 carbon atoms; n is a number representing the degree of polymerization of the oxyalkylene and corresponds to the number average molecular weight of the polyether polyol (200 to 12,000, preferably 1,000 to 6,000); and p is preferably a number of 2 to 4.

Preferable examples of the polyhydric alcohol corresponding to the $R_4$ group in the above general formula (2) include aliphatic dihydric alcohols such as ethylene glycol, propylene glycol, 1,4-butylene glycol and neopentyl glycol; trihydric alcohols such as glycerol, trihydroxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerol, pentaglycerol, 1,2,4-butanetriol, 1,2,4-pentanetriol and trimethylolpropane; tetrahydric alcohols such as erythritol, pentaerythritol, 1,2,3,4-pentanetetrol, 2,3,4,5-hexanetetrol, 1,2,3,5-pentanetetrol and 1,3,4,5-hexanetetrol; pentahydric alcohols such as adonitol, arabitol and xylitol and hexahydric alcohols such as sorbitol, mannitol and iditol.

Among these polyhydric alcohols, di-, tri- and tetrahydric alcohols are preferable and ethylene glycol, propylene glycol and glycerol are particularly preferable.

The polyether polyol represented by the above general formula (2) can be prepared by conducting the addition reaction of the above polyhydric alcohol with an alkylene oxide, preferably one having 2 to 4 carbon atoms, according to a conventional process so as to give an adduct having a desired molecular weight.

The alkylene oxide having 2 to 4 carbon atoms may be, for example, ethylene oxide, propylene oxide, butylene oxide or a hetero or block copolymer comprising two or more of them. Particularly, the use of ethylene oxide is suitable.

The polyalkylene polyether polyol compound (II-1-1) can be prepared also from other starting material(s), for example, tetrahydrofuran, alkylene oxide-tetrahydrofuran copolymer, an epihalohydrin such as epichlorohydrin and aralkylene oxide such as styrene oxide.

The polyalkylene polyether polyol compound (II-1-1) may have a primary or secondary hydroxyl group and is preferably a polyether prepared from an alkylene oxide having 2 to 6 carbon atoms, for example, polyethylene ether glycol, polyoxyethylene polyoxypropylene ether or polyoxyethylene polyoxybutylene ether.

The above polyalkylene polyether polyol compounds may be used either alone or as a mixture of two or more of them as the component (II-1-1).

The ethylene oxide content, that is, the weight ratio of the oxyethylene chain part derived from ethylene oxide to the entire oxyalkylene chain part derived from alkylene oxide (i.e., ethylene oxide, propylene oxide and butylene oxide), in the polyalkylene polyether polyol compound (II-1-1) to be used in the present invention must be 80% by weight or above, and is preferably 95 to 100% by weight. When the content is less than 80% by weight, the resulting component (II) will have an unsuitable HLB value and be poor in emulsifiability.

The urethane compound (II-1) to be used in the present invention can be prepared by reacting the above polyalkylene polyether polyol compound (II-1-1) with an excess amount of a polyisocyanate compound (II-1-2).

The polyisocyanate compound (II-1-2) includes diisocyanates (II-1-2-A) represented by the general formula:

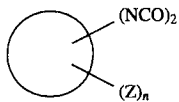

wherein O is a benzene or naphthalene ring; —NCO is a nuclear substituent isocyanate group; Z is a nuclear substituent halogen atom or a nuclear substituent alkyl or alkoxy group having at most 3 carbon atoms; and n is 0, 1 or 2, with the proviso that two Z groups are the same or different from each other when n is 2.

Examples of the diisocyanates (II-1-2-A) include 2,4-tolylene diisocyanate, 2,6-tolylene diisocyanate, 1,4-naphthylene diisocyanate, 1,5-naphthylene diisocyanate, 1,3-phenylene diisocyanate, 1,4-phenylene diisocyanate and 1-isopropenylbenzene-2,4-diisocyanate.

The polyisocyanate compound (II-1-2) also includes diisocyanates (II-1-2-B) represented by the general formula:

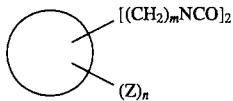

wherein O is a benzene or naphthalene ring; —$(CH_2)_m$NCO is a nuclear substituent alkylene isocyanate group; Z is a nuclear substituent halogen atom or a nuclear substituent alkyl or alkoxy group having at most 3 carbon atoms; m is 1 or 2; and n is 1 or 2, with the proviso that two $(CH_2)_m$NCO groups are the same or different from each other and that two Z groups are the same or different from each other when n is 2.

Examples of the diisocyanates (II-1-2-B) include ω,ω'-diisocyanato-1,2-dimethylbenzene and ω,ω'-diisocyanato-1,3-dimethylbenzene.

The polyisocyanate compound (II-1-2) further includes diisocyanates (II-1-2-C) represented by the general formula:

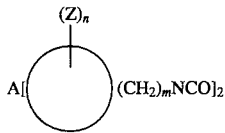

wherein A is an alkylene group having 3 or less carbon atoms, such as —$CH_2$— or

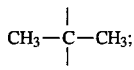

O is a benzene or naphthalene ring; Z is a nuclear substituent halogen atom or a nuclear substituent alkyl or alkoxy group having at most 3 carbon atoms; and m and n are each 0, 1 or 2, with the proviso that two $(CH_2)_m$NCO groups are the same or different from each other and that two Z groups are the same or different from each other when n is 2.

Examples of the diisocyanates (II-1-2-C) include 4,4'-diphenylmethane diisocyanate, 2,2'-dimethyldiphenylmethane 4,4'-diisocyanate, diphenyldimethylmethane 4,4'-diisocyanate and 3,3'-dichlorodiphenyldimethylmethane 4,4'-diisocyanate.

Furthermore, the polyisocyanate compound (II-1-2) includes diisocyanates (II-1-2-D) represented by the general formula:

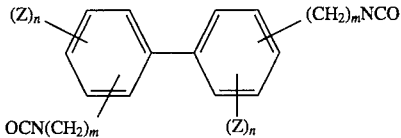

wherein Z is a nuclear substituent halogen atom or a nuclear substituent alkyl or alkoxy group having at most 3 carbon atoms; m is 0 or 1; and n is 0, 1 or 2, with the proviso that two $(CH_2)_m$NCO groups are the same or different from each other and that plural Z groups are the same or different from each other when plural Z groups are present.

Examples of the diisocyanates (II-1-2-D) include biphenyl 2,4'-diisocyanate, biphenyl 4,4'-diisocyanate, 3,3'-dimethylbiphenyl 4,4'-diisocyanate and 3,3'-dimethoxybiphenyl 4,4'-diisocyanate.

In addition, the polyisocyanate compound (II-1-2) includes diphenyl sulfone 4,4'-diisocyanate; diisocyanates prepared from the above isocyanate compounds through the hydrogenation of the aromatic ring such as dicyclohexane 4,4'-diisocyanate; ω,ω'-diisocyanato-1,2-dimethylbenzene; ω,ω'-diisocyanato-1,3-dimethylbenzene; substituted urea-containing diisocyanates prepared by reacting diisocyanates with water at a molar ratio of 2:1, for example, urea diisocyanate prepared by reacting 2,4-tolylene diisocyanate with water at a molar ratio of 2:1; uretedione diisocyanates prepared by dimerizing aromatic diisocyanates by a known process; propane 1,2-diisocyanate; 2,3-dimethylbutane 2,3-diisocyanate; 2-methylpentane 2,4-diisocyanate; octane 3,6-diisocyanate; 3,3-dinitropentane 1,5-diisocyanate; octane 1,6-diisocyanate and hexamethylene diisocyanate.

The urethane compound (II-1) can be prepared from the above polyisocyanate compound (II-1-2) and the above polyalkylene polyether polyol compound (II-1-1) by a conventional process. The reaction for forming the urethane compound (II-1) is conducted generally at 40° to 140° C., preferably at 60° to 120° C. In conducting the reaction, a known urethane polymerization catalyst may be used for accelerating the reaction and examples of the catalyst include organometallic compounds such as dibutyltin dilaurate, tin(II) octoate and stannous octoate; and tertiary amine compounds such as triethylenediamine, triethylamine and 1,8-diazabicyclo[5.4.0]undecene-7.

The reaction for preparing the urethane compound (II-1) may be conducted in a solvent such as benzene, toluene, xylene, ethyl acetate, butyl acetate or Cellosolve acetate. The solvent used can be removed in the step of preparing the emulsifiable epoxy compound (II).

The reaction for preparing the urethane compound (II-1) from the polyalkylene polyether polyol compound (II-1-1) and the polyisocyanate compound (II-1-2) is conducted with the use of an excess amount of the polyisocyanate compound (II-1-2), that is, at an equivalent ratio of the hydroxyl group of (II-1-1) to the isocyanate group of (II-1-2) being 1.0 or below. It is preferable that the reaction for preparing the urethane compound (II-1) from the polyalkylene polyether polyol compound (II-1-1) and the polyisocyanate compound (II-1-2) be conducted at an equivalent ratio of the hydroxyl group of (II-1-1) to the isocyanate group of (II-1-2) of 1.0:1.0–2.0.

The urethane compound (II-1) is particularly preferably one having an isocyanate content of 1 to 15% by weight and an average molecular weight of 500 to 8500.

The epoxy compound (II-2) having, on the average, at least 0.1, preferably at least 0.4 hydroxyl group, and at least one, preferably at least 1.3 adjacent epoxy group in its molecule according to the present invention includes those described above as epoxy resin (I) and having, on the average, at least 0.1 hydroxyl group, among which polyphenol glycidyl ethers are preferable. Examples thereof include reaction products of epichlorohydrin with bisphenol A as represented by the following formula:

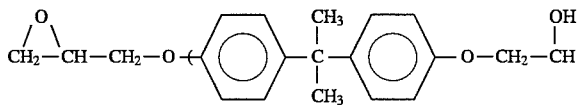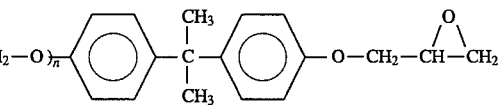

wherein n is 0 to 2, particularly preferably 0.1 to 1, and their analogues based on bisphenol F as represented by the following formula:

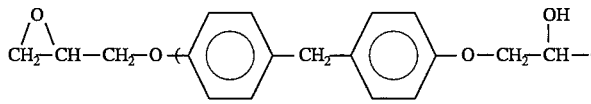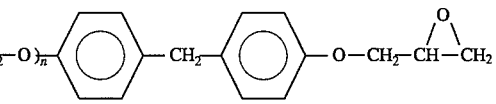

wherein n is 0 to 2, particularly preferably 0.1 to 1.

Among the above-described reaction products of epichlorohydrin with bisphenol A and their analogues based on bisphenol F, those having an epoxy equivalent (WPE) of 160 to 600 are preferable. Further, polyglycidyl ethers of glycidol, trimethylolpropane, glycerol and pentaerythritol can be advantageously used.

Furthermore, a mixture of one or more of the above epoxy compounds with one or more of the above-mentioned epoxy resins (I) is usable as component (II-2).

The alkylphenol ethoxylate (II-3) having a number average molecular weight of 300 to 5,000, preferably 800 to 2,000, according to the present invention includes those represented by the general formula:

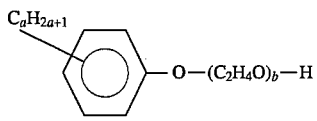

wherein a and b are such numbers as to give a number average molecular weight of 300 to 5,000 and a is preferably 7 to 10.

Examples of alkylphenol ethoxylate (II-3) include octylphenol ethoxylate and nonylphenol ethoxylate.

The emulsifiable epoxy compound (II) according to the present invention is prepared by reacting the urethane compound (II-1) prepared by the above process with an epoxy compound (II-2) having, on the average, at least 0.1 hydroxyl group and an adjacent epoxy group in its molecule and an alkylphenol ethoxylate (II-3) having a number average molecular weight of 300 to 5,000 at a molar ratio of (II-1):(II-2):(II-3) of 1.0:1.0–10.0:0.1–2.0, preferably 1.0:3.0–8.0:0.3–0.5, with the proviso that the equivalent ratio of the total hydroxyl content in (II-2) and (II-3) to the isocyanate content in (II-1) must be 1.0 or above, and is preferably 1.0 to 1.3.

The preparation of the emulsifiable epoxy compound (II) can be conducted in a similar manner to the above-mentioned one for the preparation of the urethane compound (II-1).

The emulsifiable epoxy compound (II) according to the present invention can also be prepared by reacting the polyalkylene polyether polyol compound (II-1-1) and polyisocyanate compound (II-1-2) which are the raw materials to be used in the preparation of the urethane compound (II-1), with an epoxy compound (II-2) having, on the average, at least 0.1 hydroxy group and at least one adjacent epoxy group in its molecule and an alkylphenol ethoxylate (II-3) having a number average molecular weight of 300 to 5,000 simultaneously under the above conditions.

When any step(s) in the reaction for preparing an emulsifiable epoxy compound (II) according to the present invention is conducted in an organic solvent such as benzene, toluene, xylene, ethyl acetate, butyl acetate or Cellosolve acetate, the organic solvent used can be removed from the reaction system to give the reaction product, or can be employed as a dispersion medium for the reaction product, that is, the emulsifiable epoxy compound (II), to give a disperse system such as an emulsion or suspension. Further, the organic solvent used is removed from the reaction system and then other solvents may be added to the reaction system to give a disperse system.

The disperse system comprises the emulsifiable epoxy compound (II) as the dispersoid or dispersed phase in an amount of from 10 to 90% by weight and a solvent (V) as the dispersion medium. The solvent (V) as the dispersion medium is preferably an organic solvent which is compatible with water, an organic solvent/water mixture or water. As the solvent (V), those which may not be compatible with water can also be used in a small amount.

The active organic amino compound (IV) to be used in the present invention includes compounds described in the following items ① to ④.

① Aliphatic polyamines ethylenediamine, diethylenetriamine, triethylenetetramine, dipropylenetriamine, dimethylaminopropylamine, diethylaminopropylamine, hexamethylenediamine, 1,2-propylenediamine, 1,3-propylenediamine, 2,2,4-(or 2,4,4-)trimethylhexamethylenediamine, polypropylenepolyamine, dipropylenetriamine and polyoxypropylene polyamines such as Jeffamine D-230, D-400, T-403, D-2000 and so forth (products of Mitsui Texaco).

② Allcyclic polyamines

N-aminoethylpiperazine, piperazines, 1,3-bisaminocyclohexylamine (1,3-BAC), isophoronediamine, 1-cyclohexylamino-3-aminopropane, 1,4-diaminocyclohexane, di(aminocyclohexyl)methane, 1,3-di(aminocyclohexyl)propane, 2,4-diaminocyclohexane, N,N'-diethyl-1,4-diaminocyclohexane and 3,3-dimethyl-4,4'-diaminocyclohexylmethane.

③ Aromatic polyamines
    m-xylylenediamine and p-xylylenediamine.
④ Heterocyclic polyamines
    hydantoin-ring diamines such as those represented by the formula:

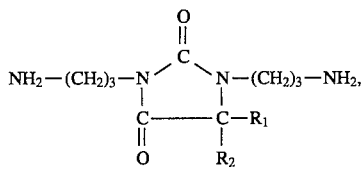

wherein $R_1$ is a hydrogen atom or an alkyl group having 1 to 6 carbon atoms, and spiro-ring diamines such as one represented by the formula:

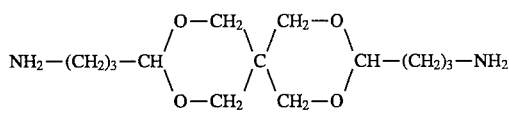

(trade name: Epomate, a product of Yuka Shell Epoxy).

Amine derivative prepared by modifying the above polyamines through amidation, the Mannich reaction or addition of an epoxy compound according to conventional processes can be favorably used in the present invention. Further, a mixture of two or more of the above polyamines and amine derivatives can also be used.

Furthermore, a self-emulsification curing agent for epoxy resins derived from the above polyamide or polyamine as disclosed in Japanese Patent Publication-B No. 31517/1978 and Japanese Patent Publication-A Nos. 335020/1992 and 351628/1992 can be favorably used in order to facilitate the emulsification and the operation.

The emulsifying epoxy resin composition comprising the epoxy resin (I), the emulsifiable epoxy compound (II) and water (III), or the emulsifying epoxy resin composition comprising the epoxy resin (I), the emulsifiable epoxy compound (II), the solvent (V) and water (III) is preferably prepared by adding water at a temperature of 50° to 90° C., preferably 20° to 70° C., either at once or in portions to a mixture of the epoxy resin (I) with the emulsifiable epoxy compound (II) or a mixture of the epoxy resin (I), the emulsifiable epoxy compound (II) and the solvent (V) at a temperature of 20° to 90° C., preferably 40° to 70° C. The emulsification may be conducted by the use of a high-speed disper, homomixer, homogenizer or the like according to conventional processes.

The emulsifying epoxy resin composition comprising components (I), (II) and (III) of the present invention contains preferably 20 to 70% by weight, still more preferably 30 to 60% by weight, of the epoxy resin (I), preferably 5 to 40% by weight, still more preferably 5 to 20% by weight, of the emulsifiable epoxy compound (II) and preferably 20 to 70% by weight, still more preferably 40 to 70% by weight, of water (III), with the proviso that the total amount of the components (I), (II) and (III) is 100% by weight. Alternatively, the emulsifying epoxy resin composition comprising components (I), (II), (III) and (V) of the present invention is prepared with the use of preferably 20 to 70% by weight, still more preferably 30 to 60% by weight, of the epoxy resin (I), preferably 5 to 40% by weight, still more preferably 8 to 20% by weight, of the disperse system comprising the emulsifiable epoxy compound (II) and the solvent (V) and preferably 20 to 70% by weight, still more preferably 40 to 70% by weight, of water (III), with the proviso that the total amount of the components (I), (II), (III) and (V) is 100% by weight. When the disperse system contains water as the dispersion medium, the water contained in the dispersed system is not considered nor calculated as the water (III).

In preparing the curable composition according to the present invention comprising the emulsifying epoxy rein composition of the present invention and an active organic amino compound (IV), the preferable ratio of the emulsifying epoxy resin composition to the active organic amino compound (IV) is calculated from the epoxy equivalent (WPE) of the emulsifying epoxy resin composition and the active hydrogen equivalent of the compound (IV). That is, the active organic amino compound (IV) is used in such an amount as to equilibrate the number of the epoxy group in the emulsifying epoxy resin composition and the number of the active hydrogen in the active organic amino compound (IV).

The epoxy equivalent (WPE) of the emulsifying epoxy resin composition is calculated as follows:

$$\text{WPE of the emulsifying epoxy resin composition} = \frac{\text{Weight of the emulsifying epoxy resin composition}}{\text{Number of epoxy groups in the components (I) and (II)}}.$$

The curable composition comprising components (I), (II), (III) and (IV) of the present invention contains preferably 20 to 70% by weight, still more preferably 20 to 60% by weight, of the epoxy resin (I), preferably 3 to 40% by weight, still more preferably 3 to 20% by weight, of the emulsifiable epoxy compound (II) and preferably 20 to 70% by weight, still more preferably 40 to 70% by weight, of water (III), with the proviso that the total amount of the components (I), (II) and (III) is 100% by weight. Alternatively, the curable composition comprising components (I), (II), (III), (IV) and (V) of the present invention is prepared with the use of preferably 20 to 70% by weight, still more preferably 20 to 60% by weight of the epoxy resin (I), preferably 5 to 40% by weight, still more preferably 5 to 20% by weight, of the disperse system comprising the emulsifiable epoxy compound (II) and the solvent (V), preferably 20 to 70% by weight, still more preferably 40 to 70% by weight, of water (III) and the desired amount of the active organic amino compound (IV), with the proviso that the total amount of the components (I), (II), (III) and (V) is 100% by weight. When the disperse system contains water as the dispersion medium, the water contained in the disperse system is not considered nor calculated as the water (III).

The emulsifying composition of the present invention or the curable composition of the present invention may further contain a conventional modifier(s) such as reactive diluent, unreactive diluting extender, filler, reinforcement, pigment, solvent, plasticizer, leveling agent, thixotropic agent, flame retardant and/or mold release agent, in addition to the above essential components.

The diluent, extender, filler, reinforcement and pigment suitably usable in the preparation of the emulsifying composition of the present invention or the curable composition of the present invention include monoglycidyl ether, dioctylphthalate (DOP), dibutylphthalate (DBP), xylene resin, benzyl alcohol, tetrahydrofurfuryl alcohol, Alolizer, coal tar, bituminous substances such as bitumen, spun fibers, cellulose, glass fiber, synthetic fiber, asbestos fiber, boron fiber, carbon fiber, cellulose, powdered polyethylene, clay, sand, stone, quartz powder, silicate minerals such as mica, powdered asbestos, pulverized shale and kaolin, aluminum hydroxide, powdered chalk, gypsum, antimony trifluoride, bentonite, silica aerogel, lithophone, barite, titanium dioxide, talc, calcium carbonate, carbon black, graphite, oxide pigments such as iron oxides, and metal powders such as aluminum powder and iron powder.

Examples of the solvent suitably usable for modifying the emulsifying epoxy resin composition of the present invention or the curable composition of the present invention include toluene, xylene, n-propanol, butyl acetate, acetone, methyl ethyl ketone, diacetone, ethanol, ethylene glycol monomethyl ether, ethylene glycol monoethyl ether and ethylene glycol monobutyl ether.

Examples of the plasticizer suitably usable for modifying the emulsifying composition of the present invention or the curable composition of the present invention include dibutyl, dioctyl and dinonyl esters of phthalic acid; tricresyl phosphate, trixylenyl phosphate and polypropylene glycol.

The emulsifying epoxy resin composition has emphatic merits that the emulsifying epoxy resin composition is superior to the self-emulsification type modified epoxy resin of the prior art as described in U.S. Pat. No. 4,608,406/1986 in emulsifiability and its storage stability. The curable composition comprising the emulsifying epoxy resin composition and an active organic amine compound (IV) has emphatic merits that when the curable composition is cured, the cure rate is high and the product obtained by curing is excellent in film strength and water resistance.

EXAMPLES

The effects of the present invention will now be specifically described by referring to the following Examples and Comparative Examples, though the present invention is not limited by them.

Preparative Example of epoxy resin (I) having, on the average, more than one adjacent epoxy group in its molecule

Preparative Example I 750 g of Epikote #828 (a product of Yuka Shell Epoxy, bisphenol-A (BPA) type epoxy resin, WPE: 190), 11 g of p-t-butylphenyl glycidyl ether and 160 g of bisphenol A were mixed together at 100° C. to form a homogeneous mixture, followed by the addition of 1.0 g of a 10% aqueous solution of sodium hydroxide. The obtained mixture was heated to 170° C. and reacted at 170° to 180° C. for 5 hours to give an epoxy resin (I-A) having a WPE of 370.

Preparative Examples of emulsifiable epoxy compounds (II)

Preparative Example II-1

6,000 g of polyethylene glycol having a molecular weight of 6,000, 350 g of toluene diisocyanate and 1,650 g of toluene were fed into a four-necked glass flask equipped with a thermometer, a stirrer and a condenser and reacted in a nitrogen atmosphere at 80° C. for 2 hours, followed by the addition of 500 g of an adduct of nonylphenol with 18 mol of ethylene oxide (average molecular weight: about 1,000) and 5,000 g of Epikote #834 (a product of Yuka Shell Epoxy, WPE: 250, hydroxyl equivalent: 860). The obtained mixture was reacted at 90° C. for 4 hours.

The reaction mixture was treated at 120° C. under normal pressure for 3 hours and then at 120° C. in a vacuum of 20 mmHg for 2 hours to remove the toluene, by which an emulsifiable epoxy compound (A) having a WPE of 640 was obtained.

Preparative Example II-2

2,000 g of polyethylene glycol having a molecular weight of 2,000, 350 g of toluene diisocyanate and 650 g of toluene were fed into a four-necked glass flask equipped with a thermometer, a stirrer and a condenser and reacted in a nitrogen atmosphere at 80° C. for 2 hours, followed by the addition of 350 g of an adduce of nonylphenol with 11 mol of ethylene oxide (average molecular weight: about 700) and 4,000 g of Epikote #834. The obtained mixture was reacted at 90° C. for 4 hours.

The reaction mixture was treated at 120° C. under normal pressure for 3 hours and then at 120° C. in a vacuum of 20 mmHg for 2 hours to remove the toluene, followed by the addition of 6,700 g of benzyl alcohol. The obtained mixture was stirred at 80° C. for one hour to give a disperse system comprising an emulsifiable epoxy compound (B) having a WPE of 925 and the benzyl alcohol.

Preparative Example II-3

8,350 g of Adeka Pluronic F-68 (polyoxyethylene polyoxypropylene ether having an ethylene oxide content of 80% by weight and an average molecular weight of 8,350, a product of Asahi Denka Kogyo K.K.), 444 g of isophorone diisocyanate and 2,200 g of toluene were fed into a four-necked glass flask equipped with a thermometer, a stirrer and a condenser and reacted in a nitrogen atmosphere at 80° C. for 2 hours, followed by the addition of 350 g of an adduct of nonylphenol with 11 mol of ethylene oxide (average molecular weight: about 700) and 4,000 g of Epikote #834. The obtained mixture was reacted at 90° C. for 5 hours.

The reaction mixture was treated at 120° C. under normal pressure for 3 hours and then at 120° C. in a vacuum of 20 mmHg for 2 hours to remove the toluene, followed by the addition of 2,630 g of tetrahydrofurfuryl alcohol and 10,510 g of benzyl alcohol. The obtained mixture was stirred at 80° C. for one hour to give a disperse system comprising an emulsifiable epoxy compound (C) having a WPE of 1810, the tetrahydrofurfuryl alcohol and the benzyl alcohol.

Preparative Example II-4

The same procedure as that of the Preparative Example II-2 was repeated except that 670 g of tetrahydrofurfuryl alcohol and 6,030 g of benzyl alcohol were used instead of the benzyl alcohol (6,700 g) finally added. A disperse system comprising an emulsifiable epoxy compound (D) having a WPE of 925, the tetrahydrofurfuryl alcohol and the benzyl alcohol was obtained.

Preparative Example II-5

The same procedure as that of the Preparative Example II-4 was repeated except that methoxyisopropanol was used instead of the tetrahydrofurfuryl alcohol. A disperse system comprising an emulsifiable epoxy compound (E) having a WPE of 925, the methoxyisopropanol and the benzyl alcohol was obtained.

Comparative Preparative Example II-1

2,000 g of polyethylene glycol having a molecular weight of 2,000, 350 g of toluene diisocyanate and 650 g of toluene were fed into a four-necked glass flask equipped with a thermometer, a stirrer and a condenser and reacted in a nitrogen atmosphere at 80° C. for 2 hours, followed by the addition of 4,500 g of Epikote #834. The obtained mixture was reacted at 90° C. for 4 hours.

The reaction mixture was treated at 120° C. under normal pressure for 3 hours and then at 120° C. in a vacuum of 20 mmHg for 2 hours to remove the toluene, followed by the addition of 6,850 g of benzyl alcohol. The obtained mixture was stirred at 80° C. for one hour to give a disperse system comprising an emulsifiable epoxy compound (F) having a WPE of 870 and the benzyl alcohol.

Comparative Preparative Example II-2

4,000 g of polyethylene glycol having a molecular weight of 4,000, 70 g of toluene diisocyanate and 1,000 g of toluene were fed into a four-necked glass flask equipped with a thermometer, a stirrer and a condenser and reacted in a nitrogen atmosphere at 80° C. for 2 hours, followed by the addition of 500 g of an adduct of nonylphenol with 18 mol of ethylene oxide (average molecular weight: about 1,000) and 4,000 g of Epikote #834. The obtained mixture was reacted at 90° C. for 4 hours.

The reaction mixture was treated at 120° C. under normal pressure for 3 hours and then at 120° C. in a vacuum of 20 mmHg for 2 hours to remove the toluene, by which an emulsifiable epoxy compound (G) having a WPE of 1,100 was obtained.

Comparative Preparative Example II-3

100 g of polyethylene glycol having a molecular weight of 100, 350 g of toluene diisocyanate and 150 g of toluene were fed into a four-necked glass flask equipped with a thermometer, a stirrer and a condenser and reacted in a nitrogen atmosphere at 80° C. for 2 hours, followed by the addition of 990 g of an adduct of nonylphenol with 18 mol of ethylene oxide (average molecular weight: about 1,000) and 4,000 g of Epikote #834. The obtained mixture was reacted at 90° C. for 4 hours.

The reaction mixture was treated at 120° C. under normal pressure for 3 hours and then at 120° C. in a vacuum of 20 mmHg for 2 hours to remove the toluene, followed by the addition of 990 g of tetrahydrofurfuryl alcohol and 3,960 g of benzyl alcohol. The obtained mixture was stirred at 80° C. for one hour to give a disperse system comprising an emulsifiable epoxy compound (H) having a WPE of 710, the tetrahydrofurfuryl alcohol and the benzyl alcohol.

Examples 1 to 8 and Comparative Examples 1 to 4

The epoxy compound (I-A) prepared in the Preparative Example I or Epikote #1001 (a product of Yuka Shell Epoxy, bisphenol type epoxy resin, WPE: 450 to 500) was mixed with one of the emulsifiable epoxy compounds and the disperse systems prepared in the Preparative Examples II-1 to II-5 and the Comparative Preparative Examples II-1 to II-3 at the ratio specified in Table 1, followed by the addition of water. The obtained mixture was stirred in a homomixer and cooled to room temperature to give an emulsifying epoxy resin composition.

The compositions of the obtained emulsifying epoxy resin compositions and the emulsifiability and storage stability thereof are given together in the Table 1.

<Evaluation criteria>
emulsifiability
  A: very good
  B: good
  C: bad
  D: very bad
storage stability (after 10 days)
  A: stable
  B: somewhat separated
  C: separated

TABLE 1

|  |  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 |
|---|---|---|---|---|---|---|---|---|---|---|---|---|---|
| Compositions (pt. by wt.) | epoxy resin (I-A) | 90 | 80 | — | 80 | 80 | — | 80 | — | 80 | — | 80 | 80 |
|  | Epikote #1001 | — | — | 80 | — | — | 80 | — | 80 | — | 80 | — | — |
|  | emulsifiable epoxy compd. (A) | 10 | — | — | — | — | — | — | — | — | — | — | — |
|  | disperse system comprising emulsifiable epoxy compd. (B) | — | 20 | 20 | — | — | — | — | — | — | — | — | — |
|  | disperse system comprising emulsifiable epoxy compd. (C) | — | — | — | 20 | — | — | — | — | — | — | — | — |
|  | disperse system comprising emulsifiable epoxy compd. (D) | — | — | — | — | 20 | 20 | — | — | — | — | — | — |
|  | disperse system comprising emulsifiable epoxy compd. (E) | — | — | — | — | — | — | 20 | 20 | — | — | — | — |
|  | disperse system comprising emulsifiable epoxy compd. (F) | — | — | — | — | — | — | — | — | 20 | 20 | — | — |
|  | emulsifiable epoxy compd. (G) | — | — | — | — | — | — | — | — | — | — | 20 | — |
|  | disperse system comprising emulsifiable epoxy compd. (H) | — | — | — | — | — | — | — | — | — | — | — | 20 |
|  | water | 100 | 100 | 100 | 100 | 100 | 100 | 100 | 100 | 100 | 100 | 100 | 100 |
| WPE of emulsifying epoxy compd. |  | 770 | 915 | 840 | 885 | 915 | 840 | 915 | 840 | 835 | 1000 | 855 | 800 |
| emulsifiability |  | B | A | B | A | A | B | B | B | C | C | D | D |
| storage stability |  | A | A | A | A | A | A | A | A | B | B | B | C |

Examples 9 to 19 and Comparative Examples 5 to 10

Each of the active organic amino compounds listed in Table 2 and water were added to the emulsifying epoxy resin compositions prepared in the Examples 1 to 8 and Comparative Examples 1 and 2 to prepare curable compositions. The products produced by curing these curable compositions were examined for properties.

The results are given in the Table 2.

<Evaluation criteria>
emulsifiability
  A: very good workability in emulsification B: good workability in emulsification
C: bad workability in emulsification
state of coating film on the next day
A: stable
B: slight separation of upper layer
cross-cut test and pencil hardness determined after curing at room temperature for 7 days

TABLE 2

|  |  | Ex. | | | | | | | | | | |
|---|---|---|---|---|---|---|---|---|---|---|---|---|
|  |  | 9 | 10 | 11 | 12 | 13 | 14 | 15 | 16 | 17 | 18 | 19 |
| Compositions (pt. by wt.) | compn. of Ex. 1 | 100 | — | — | — | — | — | — | — | — | — | — |
|  | compn. of Ex. 2 | — | 100 | — | — | — | — | — | — | — | — | — |
|  | compn. of Ex. 3 | — | — | 100 | — | — | — | — | — | — | — | — |
|  | compn. of Ex. 4 | — | — | — | 100 | — | — | — | — | — | — | — |
|  | compn. of Ex. 5 | — | — | — | — | 100 | 100 | 100 | — | — | — | — |
|  | compn. of Ex. 6 | — | — | — | — | — | — | — | 100 | — | — | — |
|  | compn. of Ex. 7 | — | — | — | — | — | — | — | — | 100 | 100 | — |
|  | compn. of Ex. 8 | — | — | — | — | — | — | — | — | — | — | 100 |
|  | ACR hardener H-23-50W*1 | — | — | 32 | — | — | — | — | — | — | — | — |
|  | ACR hardener H-4163*2 | 24 | 20 | — | — | 20 | — | — | 20 | — | — | 20 |
|  | ACR hardener H-46*3 | — | — | — | — | — | — | — | — | — | 9 | — |
|  | Adeka hardener EH-220*4 | — | — | — | 9 | — | — | — | — | — | — | — |
|  | m-xylylenediamine | — | — | — | — | — | 3.5 | — | — | — | — | — |
|  | isophoronediamine | — | — | — | — | — | — | — | — | 4.5 | — | — |
|  | Jeffamine D-230*5 | — | — | — | — | — | — | 7 | — | — | — | — |
|  | water | 60 | 60 | 45 | 50 | 60 | 40 | 45 | 60 | 40 | 45 | 60 |
| emulsifiability |  | B | A | B | B | A | B | B | A | B | B | A |
| state of coating film on next day |  | A | A | A | A | A | A | A | A | A | A | A |
| cross-cut test |  | 100/100 | ← | ← | ← | ← | ← | ← | ← | ← | ← | ← |
| pencil hardness |  | H | 2H | H | H | 2H | 2H | H | H | 2H | H | H |

TABLE 3

|  |  | Comp. Ex. | | | | | |
|---|---|---|---|---|---|---|---|
|  |  | 5 | 6 | 7 | 8 | 9 | 10 |
| Compositions (pt. by wt.) | compn. of Comp. Ex. 1 | 100 | — | 100 | — | 100 | — |
|  | compn. of Comp. Ex. 2 | — | 100 | — | 100 | — | 100 |
|  | ACR hardener H-4163*2 | 23 | 19 | — | — | — | — |
|  | m-xylylenediamine | — | — | 4 | 3.5 | — | — |
|  | isophoronediamine | — | — | — | — | — | 4.5 |
|  | Jeffamine D-230*5 | — | — | — | — | 8 | — |
|  | water | 60 | 55 | 40 | 40 | 50 | 40 |
| emulsifiability |  | C | C | C | C | C | C |
| state of coating film on next day |  | B | B | B | B | B | B |
| cross-cut test |  | 60/100 | 30/100 | 50/100 | 60/100 | 40/100 | 50/100 |
| pencil hardness |  | B | B | HB | B | B | HB | note)
*1: ACR hardener H-23-50W self-emulsification type Polyamide curing agent, a product of ACR, solid content: 50% by weight, amine value: 140 mgKOH/g
*2: ACR hardener H-4163 self-emulsification type curing agent, a product of ACR, viscosity (25° C.): 40 poise, amine value: 250 mgKOH/g
*3: ACR hardener H-46 modified aliphatic polyamine curing agent, a product of ACR, viscosity (25° C.): 20 poise, amine value: 350 mgKOH/g
*4: Adeka hardener EH-220 aliphatic polyamine curing agent, a product of Asahi Denka Kogyo K.K., solid content: 100% by weight, amine value: 350 mgKOH/g
*5: Jeffamine D-230 polyoxypropylene polyamine, a product of Mitsui Texaco The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A curable composition comprising:

(I) an epoxy resin having, on the average, more than one epoxy group having an oxygen atom bonded to adjacent carbon atoms in its molecule, (II) an emulsifiable epoxy compound which is prepared by reacting an urethane compound (II-1), prepared by the reaction of a polyalkylene polyether polyol compound (II-1-1) having a number average molecular weight of 200 to 12,000 and an ethylene oxide content of 80% by weight or above with an excess amount of a polyisocyanate compound (II-1-2), with an epoxy compound (II-2) having, on the average, at least 0.1 hydroxyl group and at least one epoxy group having an oxygen atom bonded to adjacent carbon atoms and an alkylphenol ethoxylate (II-3) having a number average molecular weight of 300 to 5,000 at a molar ratio of (II-1):(II-2):(II-3) of 1.0:1.0–10.0:0.1–2.0, with the proviso that the equivalent ratio of the total hydroxyl content in (II-2) and (II-3) to the isocyanate content in (II-1) must be 1.0 or above, (III) water, and (IV) an active organic amino compound.

2. The curable composition according to claim 1, wherein the active organic amino compound is one member selected from the group consisting of aliphatic polyamines, alicyclic polyamines, aromatic polyamines, heterocyclic polyamines, amine derivatives prepared by modifying an aliphatic, alicyclic, aromatic or heterocyclic polyamine through amidation, the Mannich reaction or addition of epoxy compound, and self-emulsifiable curing agents for epoxy resins.

3. The curable composition according to claim 1, which contains 20 to 70% by weight of the epoxy resin (I), 3 to 40% by weight of the emulsifiable epoxy compound (II) and 20 to 70% by weight of water (III), with the proviso that the total amount of the components (I), (II) and (III) is 100% by weight.

4. A curable composition comprising:

(I) an epoxy resin having, on the average, more than one epoxy group having an oxygen atom bonded to adjacent carbon atoms in its molecule, (II) an emulsifiable epoxy compound which is prepared by reacting an urethane compound (II-1), prepared by the reaction of a polyalkylene polyether polyol compound (II-1-1) having a number average molecular weight of 200 to 12,000 and an ethylene oxide content of 80% by weight or above with an excess amount of a polyisocyanate compound (II-1-2), with an epoxy compound (II-2) having, on the average, at least 0.1 hydroxyl group and at least one epoxy group having an oxygen atom bonded to adjacent carbon atoms and an alkylphenol ethoxylate (II-3) having a number average molecular weight of 300 to 5,000 at a molar ratio of (II-1):(II-2):(II-3) of 1.0:1.0–10.0:0.1–2.0, with the proviso that the equivalent ratio of the total hydroxyl content in (II-2) and (II-3) to the isocyanate content in (II-1) must be 1.0 or above, (V) a solvent, (III) water, and (IV) an active organic amino compound.

5. The curable composition according to claim 4, wherein the active organic amino compound is one member selected from the group consisting of aliphatic polyamines, alicyclic polyamines, aromatic polyamines, heterocyclic polyamines, amine derivatives prepared by modifying an aliphatic, alicyclic, aromatic or heterocyclic polyamine through amidation, the Mannich reaction or addition of epoxy compound, and self-emulsifiable curing agents for epoxy resins.

6. The curable composition according to claim 4, wherein the emulsifiable epoxy compound (II) and the solvent (V) is incorporated in the form of a dispersed system comprising the emulsifiable epoxy compound (II) in an amount of 10 to 90% by weight as the dispersoid or dispersed phase and the solvent (V) as the dispersion medium.

7. The emulsifying epoxy resin composition according to claim 6, which is prepared with the use of 20 to 70% by weight of the epoxy resin (I), 5 to 40% by weight of the dispersed system comprising the emulsifiable epoxy compound (II) and the solvent (V), and 20 to 70% by weight of water (III), with the proviso that the total amount of the components (I), (II), (III) and (V) is 100% by weight, and the active organic amino compound (IV).

8. A curable composition consisting essentially of:

(I) an epoxy resin having, on the average, more than one epoxy group having an oxygen atom bonded to adjacent carbon atoms in its molecule, (II) an emulsifiable epoxy compound which is prepared by reacting an urethane compound (II-1), prepared by the reaction of a polyalkylene polyether polyol compound (II-1-1) having a number average molecular weight of 200 to 12,000 and an ethylene oxide content of 80% by weight or above with an excess amount of a polyisocyanate compound (II-1-2), with an epoxy compound (II-2) having, on the average, at least 0.1 hydroxyl group and at least one epoxy group having an oxygen atom bonded to adjacent carbon atoms and an alkylphenol ethoxylate (II-3) having a number average molecular weight of 300 to 5,000 at a molar ratio of (II-1):(II-2):(II-3) of 1.0:1.0–10.0:0.1–2.0, with the proviso that the equivalent ratio of the total hydroxyl content in (II-2) and (II-3) to the isocyanate content in (II-1) must be 1.0 or above, (III) water, and (IV) an active organic amino compound.

9. A curable composition consisting essentially of:

(I) an epoxy resin having, on the average, more than one epoxy group having an oxygen atom bonded to adjacent carbon atoms in its molecule, (II) an emulsifiable epoxy compound which is prepared by reacting an urethane compound (II-1), prepared by the reaction of a polyalkylene polyether polyol compound (II-1-1) having a number average molecular weight of 200 to 12,000 and an ethylene oxide content of 80% by weight or above with an excess amount of a polyisocyanate compound (II-1-2), with an epoxy compound (II-2) having, on the average, at least 0.1 hydroxyl group and at least one epoxy group having an oxygen atom bonded to adjacent carbon atoms and an alkylphenol ethoxylate (II-3) having a number average molecular weight of 300 to 5,000 at a molar ratio of (II-1):(II-2):(II-3) of 1.0:1.0–10.0:0.1–2.0, with the proviso that the equivalent ratio of the total hydroxyl content in (II-2) and (II-3) to the isocyanate content in (II-1) must be 1.0 or above, (V) a solvent, (III) water, and (IV) an active organic amino compound.

* * * * *